US012793260B1

(12) United States Patent
Thimirachandra

(10) Patent No.: US 12,793,260 B1
(45) Date of Patent: Nov. 10, 2026

(54) DEPTH BUBBLE LEVEL FOR 3D COMPUTATIONAL SYSTEMS

(71) Applicant: Zebra Technologies Corporation, Lincolnshire, IL (US)

(72) Inventor: Sanjeewa Thimirachandra, Kotugoda (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/213,343

(22) Filed: May 20, 2025

(51) Int. Cl.
*G06T 7/73* (2017.01)
*G06T 7/13* (2017.01)
*G06T 7/50* (2017.01)

(52) U.S. Cl.
CPC .................. *G06T 7/73* (2017.01); *G06T 7/13* (2017.01); *G06T 7/50* (2017.01); *G06T 2200/04* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

2007/0126876 A1* 6/2007 Gallagher ................. G06T 3/00 348/E5.041
2013/0223673 A1* 8/2013 Davis ...................... G06F 3/147 235/375
2013/0266223 A1* 10/2013 Zhang ...................... G06T 7/187 382/173
2016/0127630 A1* 5/2016 Kitajima ................... G06T 5/94 348/370
2021/0150805 A1* 5/2021 Stekovic ................ G06N 20/00
2022/0198737 A1* 6/2022 Enthed ................. G06N 3/0464
2023/0085156 A1* 3/2023 Prasad .................. A63F 13/358 709/219
2023/0377182 A1* 11/2023 Shin ........................ G06T 7/593

OTHER PUBLICATIONS

Ohno, Differential-geometry-based surface normal vector calculation method using a time-of-flight camera, vol. 60, No. 20 / Jul. 10, 2021 / Applied Optics Research (Year: 2021).*

* cited by examiner

*Primary Examiner* — Xiaolan Xu

(57) ABSTRACT

Imaging devices, systems, and methods for determining a 3-dimensional (3D) angular offset are described herein. An example device includes: one or more processors; a 3D imaging assembly; and a computer-readable medium storing machine readable instructions. The example device may capture a 3D image data stream of a field of view (FOV) along an imaging axis, the 3D image data stream including a plurality of pixels indicative of corresponding depth values. The example device may then determine a region of interest (ROI) in the FOV, the ROI including at least a subset of the plurality of pixels, and generate a plane that fits at least some pixels of the subset of the plurality of pixels. The example device may then determine a 3D angular offset between a surface normal of the plane and the imaging axis and generate an indicator indicative of the 3D angular offset.

26 Claims, 8 Drawing Sheets

Depth Bubble Level Not Aligned

Depth Bubble Level Aligned

DEPTH BUBBLE LEVEL FOR 3D COMPUTATIONAL SYSTEMS

BACKGROUND

Modern scanning systems are often used for various measuring operations, such as parcel dimensioning operations, machine vision operations, object recognition, etc. As such, modern scanning systems may require a dynamic alignment of a target surface (e.g., of an object) against an imaging axis of a 3-dimensional (3D) imaging assembly of the scanning system (e.g., a time-of-flight (ToF) depth camera axis, an augmented reality red-green-blue (RGB) camera axis, etc.). Such imaging assemblies may depend on an incident angle of light at the target surface. For example, when light contacts a target surface with a lower tilt angle (i.e., near perpendicular to the surface), much of the light can be reflected back to the imaging assembly and/or sensor thereof, which improves the signal-to-noise ratio (SNR) and enables the generation of depth points with high confidence levels and/or minimal depth holes.

However, it may be challenging for these systems to determine whether the surface of an object is perpendicular to the imaging axis of the 3D imaging assembly based on one or more characteristics of the object. For example, objects with low reflectivity (e.g., darker surfaces) reflect lower quantities of light, reducing the quality of images and causing difficulties in recognizing a position of the target surface angle for the object relative to the imaging axis. Moreover, there is no such technique that provides a gauge for a user to measure alignment in real time and/or provides an indication to the user regarding whether the surface is properly aligned.

SUMMARY

In some aspects, the techniques described herein relate to an imaging device, including: one or more processors; a 3-dimensional (3D) imaging assembly; and a computer-readable medium storing machine readable instructions that, when executed, cause the one or more processors to: capture, using the 3D imaging assembly, a 3D image data stream of a field of view (FOV) along an imaging axis, the 3D image data stream including a plurality of pixels indicative of corresponding depth values; determine a region of interest (ROI) in the FOV, the ROI including at least a subset of the plurality of pixels; generate a plane that fits at least some pixels of the subset of the plurality of pixels; determine a 3D angular offset between a surface normal of the plane and the imaging axis; and generate an indicator indicative of the 3D angular offset.

In some aspects, the techniques described herein relate to an imaging device, wherein the computer-readable medium stores further machine readable instructions that, when executed, cause the one or more processors to: detect a change in the corresponding depth values corresponding to updated positions of the subset of the plurality of pixels; and generate an updated plane based on the updated positions of the subset of the plurality of pixels.

In some aspects, the techniques described herein relate to an imaging device, wherein the computer-readable medium stores further machine readable instructions that, when executed, cause the one or more processors to: determine an updated 3D angular offset between an updated surface normal of the updated plane and the imaging axis; and generate an updated indicator indicative of the updated 3D angular offset.

In some aspects, the techniques described herein relate to an imaging device, wherein: the indicator is a virtual representation of the 3D angular offset displayed to a user via a screen of the imaging device at a first location of the screen, the first location based on the 3D angular offset; and generating the updated indicator includes: determining a second location of the virtual representation based on the updated 3D angular offset, and causing the screen to display movement of the virtual representation from the first location to the second location.

In some aspects, the techniques described herein relate to an imaging device, wherein: the indicator is a virtual representation of the 3D angular offset displayed to a user via a screen of the imaging device at a determined location of the screen, the determined location based on the 3D angular offset; and the determined location of the screen is within the ROI when the 3D angular offset is within a threshold value of zero.

In some aspects, the techniques described herein relate to an imaging device, wherein the computer-readable medium stores further machine readable instructions that, when executed, cause the one or more processors to: generate a boundary that encompasses the ROI, wherein the boundary delimits a boundary of movement for the indicator.

In some aspects, the techniques described herein relate to an imaging device, wherein: the indicator is a virtual representation of the 3D angular offset displayed to a user via a screen of the imaging device at a determined location of the screen, the determined location based on the 3D angular offset; and the determined location is located between a center of the ROI and an edge of the boundary such that the determined location is proportional to a ratio between the 3D angular offset and a maximum 3D angular offset value.

In some aspects, the techniques described herein relate to an imaging device, wherein the computer-readable medium stores further machine readable instructions that, when executed, cause the one or more processors to: filter the corresponding depth values to remove depth values other than the subset of the plurality of pixels.

In some aspects, the techniques described herein relate to an imaging device, wherein the computer-readable medium stores further machine readable instructions that, when executed, cause the one or more processors to: filter depth values of the subset of the plurality of pixels to remove depth values associated with confidence level values that do not meet a predetermined threshold confidence value.

In some aspects, the techniques described herein relate to an imaging device, wherein the computer-readable medium stores further machine readable instructions that, when executed, cause the one or more processors to: determine whether the subset of the plurality of pixels includes a number of pixels that meets a minimum pixel threshold value; and wherein generating the plane is responsive to determining that the number of pixels meets the minimum pixel threshold value.

In some aspects, the techniques described herein relate to an imaging device, wherein the computer-readable medium stores further machine readable instructions that, when executed, cause the one or more processors to: generate an indication of an error state responsive to determining that the number of pixels does not meet the minimum pixel threshold value.

In some aspects, the techniques described herein relate to an imaging device, wherein generating the indication of the error state includes at least one of: (i) obfuscating the indicator or (ii) changing a color of the indicator.

In some aspects, the techniques described herein relate to an imaging device, wherein the computer-readable medium stores further machine readable instructions that, when executed, cause the one or more processors to: responsive to generating the indication of the error state, determine an updated ROI in the FOV for the 3D image data stream, the updated ROI including at least an updated subset of the plurality of pixels; and wherein generating the plane is based on the updated subset of the plurality of pixels.

In some aspects, the techniques described herein relate to a method, implemented in an imaging device including a 3-dimensional (3D) imaging assembly, the method including: capturing, via one or more processors and using the 3D imaging assembly, a 3D image data stream of a field of view (FOV) along an imaging axis, the 3D image data stream including a plurality of pixels indicative of corresponding depth values; determining, via the one or more processors, a region of interest (ROI) in the FOV, the ROI including at least a subset of the plurality of pixels; generating, via the one or more processors, a plane that fits at least some pixels of the subset of the plurality of pixels; determining, via the one or more processors, a 3D angular offset between a surface normal of the plane and the imaging axis; and generating, via the one or more processors, an indicator indicative of the 3D angular offset.

In some aspects, the techniques described herein relate to a method, further including: detecting, via the one or more processors, a change in the corresponding depth values corresponding to updated positions of the subset of the plurality of pixels; and generating, via the one or more processors, an updated plane based on the updated positions of the subset of the plurality of pixels.

In some aspects, the techniques described herein relate to a method, further including: determining, via the one or more processors, an updated 3D angular offset between an updated surface normal of the updated plane and the imaging axis; and generating, via the one or more processors, an updated indicator indicative of the updated 3D angular offset.

In some aspects, the techniques described herein relate to a method, wherein: the indicator is a virtual representation of the 3D angular offset displayed to a user via a screen of the imaging device at a first location of the screen, the first location based on the 3D angular offset; and generating the updated indicator includes: determining a second location of the virtual representation based on the updated 3D angular offset, and causing the screen to display movement of the virtual representation from the first location to the second location.

In some aspects, the techniques described herein relate to a method, wherein: the indicator is a virtual representation of the 3D angular offset displayed to a user via a screen of the imaging device at a determined location of the screen, the determined location based on the 3D angular offset; and the determined location of the screen is within the ROI when the 3D angular offset is within a threshold value of zero.

In some aspects, the techniques described herein relate to a method, further including: generating, via the one or more processors, a boundary that encompasses the ROI, wherein the boundary delimits a boundary of movement for the indicator.

In some aspects, the techniques described herein relate to a method, wherein: the indicator is a virtual representation of the 3D angular offset displayed to a user via a screen of the imaging device at a determined location of the screen, the determined location based on the 3D angular offset; and the determined location is located between a center of the ROI and an edge of the boundary such that the determined location is proportional to a ratio between the 3D angular offset and a maximum 3D angular offset value.

In some aspects, the techniques described herein relate to a method, further including: filtering, via the one or more processors, the corresponding depth values to remove depth values other than the subset of the plurality of pixels.

In some aspects, the techniques described herein relate to a method, further including: filtering, via the one or more processors, depth values of the subset of the plurality of pixels to remove depth values associated with confidence level values that do not meet a predetermined threshold confidence value.

In some aspects, the techniques described herein relate to a method, further including: determining, via the one or more processors, whether the subset of the plurality of pixels includes a number of pixels that meets a minimum pixel threshold value; and wherein generating the plane is responsive to determining that the number of pixels meets the minimum pixel threshold value.

In some aspects, the techniques described herein relate to a method, further including: generating, via the one or more processors, an indication of an error state responsive to determining that the number of pixels does not meet the minimum pixel threshold value.

In some aspects, the techniques described herein relate to a method, wherein generating the indication of the error state includes at least one of: (i) obfuscating the indicator or (ii) changing a color of the indicator.

In some aspects, the techniques described herein relate to a method, further including: responsive to generating the indication of the error state, determining, via the one or more processors, an updated ROI in the FOV for the 3D image data stream, the updated ROI including at least an updated subset of the plurality of pixels; and wherein generating the plane is based on the updated subset of the plurality of pixels.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1A:
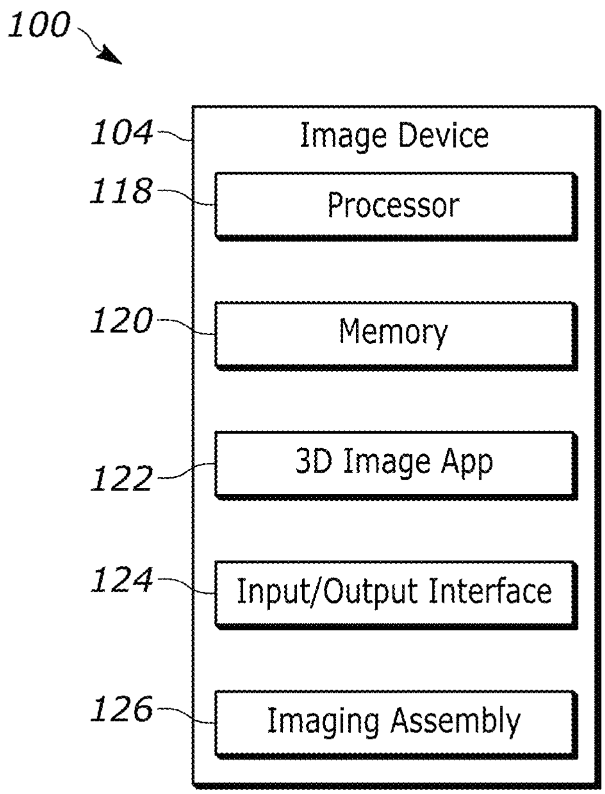
FIG. 1A illustrates a block diagram of one or more software and hardware components of an example imaging device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In modern imaging systems, the imaging device may rely on a low tilt angle of light reflected from an object to the imaging device for object measurement and/or dimensioning purposes. In such imaging systems, the positioning of the target surface of the object may influence the quality and/or ability of the imaging device to generate depth points and measure dimensions of the object. Imaging devices may perform better when the target surface is perpendicular to an imaging axis of the imaging device. Generally, measurements and detection of the target surface are based on the quantity of light reflected back from the object to the imaging device. However, this may be challenging for objects that may reflect light differently, such as the contrast between low reflectivity objects (e.g., dark objects) and high reflectivity objects (e.g., light objects). As such, there exists a need for a system that can provide a gauge for a user to measure an alignment of the imaging axis for the imaging device and a surface normal of the target surface of the object.

FIG. 1A illustrates an example imaging system 100 configured to generate an indicator for a 3D angular offset in accordance with various embodiments disclosed herein. More specifically, the imaging system 100 is configured to determine a plane representative of at least a portion of a FOV, determine a surface normal of the plane, and determine whether the imaging device is aligned correctly with the surface normal. In the example embodiment of FIG. 1A, the imaging system 100 may be an imaging device 104 that, in some implementations, may be communicatively coupled to a user computing device (not shown) via a network (not shown). Generally speaking, the imaging device 104 may be capable of executing instructions to, for example, implement operations of the example methods described herein, as may be represented by the flowcharts of the drawings that accompany this description.

The imaging device 104 is configured to interpret and execute imaging jobs and/or various determinations of planes, surface normals, and/or 3D angular offsets. Generally, the imaging device 104 may capture a stream of 3D image data, determine a plane for a given object within a FOV of the imaging device 104, and determine a 3D angular offset of the imaging axis of the imaging device 104 compared to a surface normal of the determined plane. In some implementations, the imaging device 104 may include flash memory used for determining, storing, or otherwise processing imaging data/datasets and/or post-imaging data. The imaging device 104 may receive, recognize, and/or otherwise interpret a trigger that causes the imaging device 104 to capture an image of the target object and/or determine a 3D angular offset in accordance with the configuration. In various embodiments, the imaging device 104 may be a 3D camera and/or may otherwise be configured to obtain a 3D image stream and perform operations as described herein.

In some implementations, the imaging device 104 may include one or more processors 118, one or more memories 120, a 3D imaging application 122, an I/O interface 124, and an imaging assembly 126. The imaging assembly 126 may include a digital camera and/or digital video camera for capturing or taking digital images and/or frames. Each digital image may comprise pixel data, vector information, 3D distance information, or other image data that may be analyzed by the imaging device 104 to perform various operations as described herein. The digital camera and/or digital video camera of, e.g., the imaging assembly 126 may be configured, as disclosed herein, to take, capture, obtain, or otherwise generate digital images and, at least in some embodiments, may store such images in a memory (e.g., memory 120) of a respective device (e.g., imaging device 104, a user computing device, etc.).

For example, the imaging assembly 126 may include a photo-realistic camera (not shown) for capturing, sensing, or scanning 2D or 3D image data. The photo-realistic camera may be an RGB (red, green, blue) based camera for capturing 2D or 3D images having RGB-based pixel data. In various embodiments, the imaging assembly may additionally or alternatively include or be a three-dimensional (3D) camera (not shown) for capturing, sensing, or scanning 3D image data. The 3D camera may include an Infra-Red (IR) projector and a related IR camera for capturing, sensing, or scanning 3D image data/datasets. A 3D camera of the imaging assembly 126 may include one or more of a time-of-flight (ToF) camera, a stereo vision camera, a structured light camera, a range camera, a 3D profile sensor, or a triangulation 3D imager. In some implementations, the 3D camera uses illumination and/or ambient light to measure a distance between the 3D camera and an object (e.g., distance data). However, some objects (e.g., objects having dark surfaces and/or surfaces with low contrast) may be difficult to illuminate and/or image properly. As such, the instant techniques may provide methods for properly aligning an imaging device (e.g., imaging device 104) to capture image data and/or make determinations based on such.

In some embodiments, the imaging assembly includes a camera capable of capturing color information of a field of view (FOV) of the camera. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and a 2D camera as a single imaging apparatus configured to capture 3D depth image data simultaneously with 2D image data. The captured 2D images and the corresponding 2D image data may be depth-aligned with the 3D images and 3D image data. In examples, a 3D image may include a point cloud or 3D point cloud. As such, as used herein, the terms 3D image and point cloud or 3D point cloud may be understood to be interchangeable.

In embodiments, the imaging assembly 126 may be configured to capture images of surfaces or areas of a predefined search space or target objects within the predefined search space. For example, each tool included in a job script may additionally include a region of interest (ROI) corresponding to a specific region or a target object in an image stream and/or otherwise imaged by the imaging assembly 126. The ROI may be determined through analysis of the image by the processor 118. In further implementations, the ROI may include or be based on a user-directed FOV (e.g., by physically moving the camera around to center a particular object, by indicating an object (e.g., via a tap or other touch/button event), by performing a zoom function, etc.). In various embodiments, one or more ROIs may be within a FOV of the imaging system such that any region of the FOV of the imaging system may be an ROI.

The imaging device 104 may also process the 2D image data/datasets and/or 3D image datasets for use by other devices (e.g., a user computing device, an external server, etc.). For example, the one or more processors 118 may process the image data or datasets captured, scanned, or sensed by the imaging assembly 126. The processing of the image data may generate post-imaging and/or additional image stream data that may include metadata, simplified data, normalized data, result data, status data, or alert data as determined from the original scanned or sensed image data. As described herein, the imaging device 104 may store such data, and may also send the image data and/or the post-imaging data to another application implemented on a user device, such as a mobile device, a tablet, a handheld device, or a desktop device.

In some implementations, the memory 120 may include one or more forms of volatile and/or non-volatile, fixed, and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., 3D imaging application 122, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 118 (e.g., working in connection with the respective operating system in the memory 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The memory 120 may store an operating system (OS) (e.g., Microsoft Windows, Linux, Unix, etc.) capable of facilitating the functionalities, apps, methods, or other software as discussed herein. The memory 120 may also store the 3D imaging application 122, which may be configured to enable image streaming, indicator generation, and 3D angular offset determination, as described further herein. The memory 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, and/or otherwise be part of, an imaging application, where each may be configured to facilitate their various functionalities discussed herein. It should be appreciated that one or more other applications may be envisioned and are executed by the one or more processors.

The one or more processors 118 may be connected to the memory 120 via a computer bus responsible for transmitting electronic data, data packets, or otherwise electronic signals to and from the one or more processors 118 and the memory 120 to implement or perform the machine readable instructions, methods, processes, elements or limitations, as illustrated, depicted, or described for the various flowcharts, illustrations, diagrams, figures, and/or other disclosure herein.

The one or more processors 118 may interface with the memory 120 via the computer bus to execute the operating system (OS). The one or more processors 118 may also interface with the memory 120 via the computer bus to create, read, update, delete, or otherwise access or interact with the data stored in the memory 120 and/or external databases (e.g., a relational database, such as Oracle, DB2, MySQL, or a NoSQL based database, such as MongoDB). The data stored in the memory 120 and/or an external database may include all or part of any of the data or information described herein, including, for example, machine vision job images (e.g., images captured by the imaging device 104 in response to execution of a job script) and/or other suitable information.

The 3D imaging application 122 may be configured to capture 3D image data of an object, calculate a 3D angular offset, and generate an indicator for such as described in more detail below with regard to FIGS. 3-6. In some such implementations, the 3D imaging application 122 performs additional operations after ensuring the imaging device 104 is properly aligned with the object. For example, the 3D imaging application 122 may include instructions to capture and/or analyze an image to determine one or more measurements that may be difficult to determine with sufficient accuracy without an indicator of proper alignment. As an example, the 3D imaging application 122 may measure the depth and/or length of tire treads/grooves as well as a distance from the tire to the imaging device 104. Depending on the implementation, the 3D imaging application 122 may use a 3D camera to perform the operations, and may analyze or utilize stereovision data, augmented reality data, RGB data, etc. for determining and/or driving the surface inclination bubble level.

The I/O interface 124 may include or implement operator interfaces configured to present information to an administrator or operator and/or receive one or more inputs from the administrator or operator. An operator interface may provide a display screen (e.g., via the imaging device 104 and/or a communicatively coupled user computing device) which a user/operator may use to visualize any images, graphics, text, data, features, pixels, objects, surfaces, and/or other suitable visualizations or information. For example, the imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interface 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the imaging device 104.

As described herein, in some embodiments, the imaging device 104 may perform the functionalities as discussed herein as part of a "cloud" network or may otherwise communicate with other hardware or software components within the cloud to send, retrieve, or otherwise analyze data or information described herein.

Figure 1B:
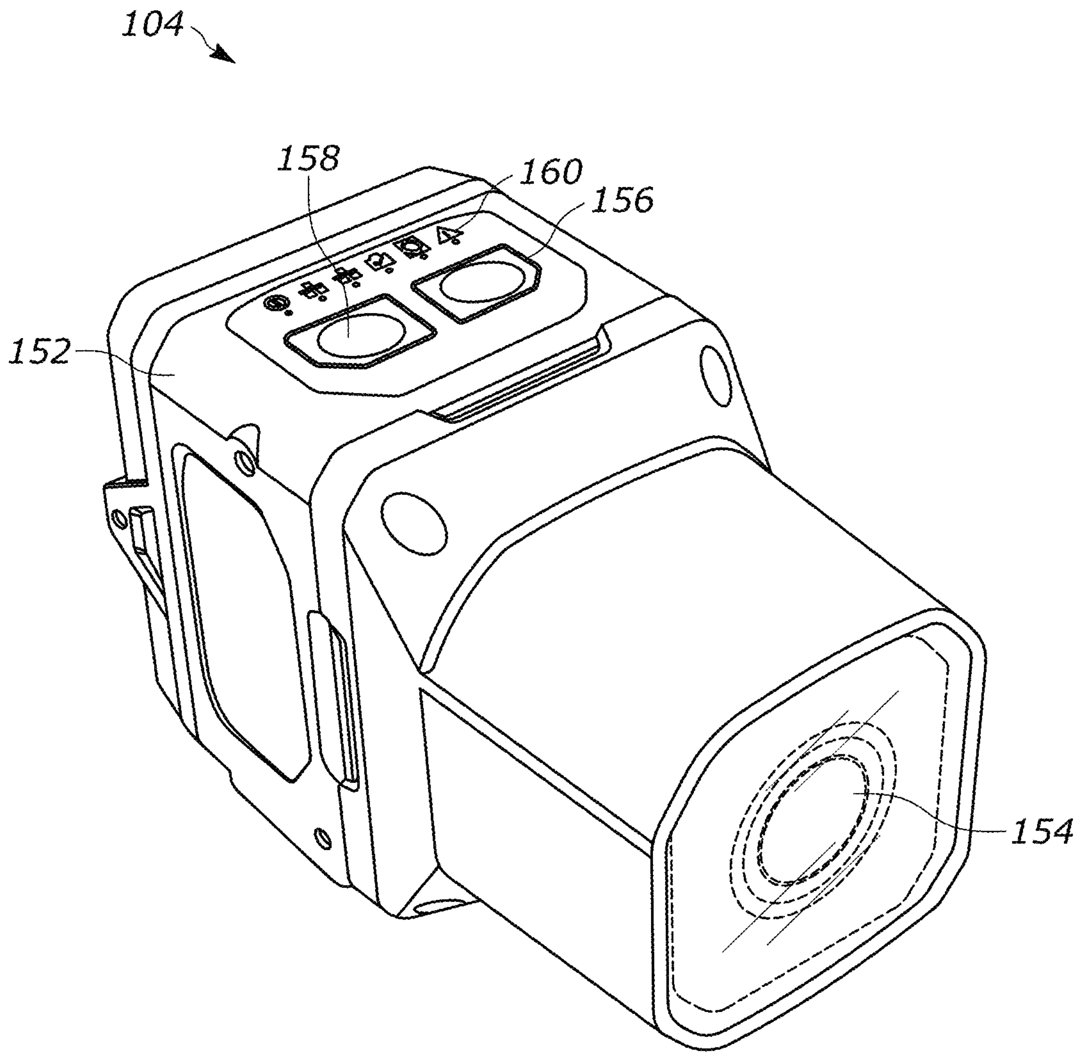
FIG. 1B illustrates a perspective view of an exemplary imaging device, such as the example imaging device of FIG. 1A.

FIG. 1B is a perspective view of an example imaging device 104 that may be implemented in the imaging system 100 of FIG. 1A, in accordance with embodiments described herein. The imaging device 104 includes a housing 152, an imaging aperture 154, a user interface label 156, a dome switch/button 158, and one or more light emitting diodes (LEDs) 160. As previously mentioned, the imaging device 104 may execute instructions to perform various operations as described herein. In some implementations, the instructions include adjustments to device configuration settings (also referenced herein as "imaging settings") operable to adjust the configuration of the imaging device 104 prior to and/or while capturing images and/or the image data stream of a target object.

For example, the device configuration settings may include instructions to adjust one or more settings related to the imaging aperture 154. As an example, the instructions may include device configuration settings to modify the aperture size of the imaging aperture 154. The imaging device 104 may interpret these instructions (e.g., via one or more processors 118) and accordingly increase or decrease the aperture size of the imaging aperture 154. Thus, the imaging device 104 may be configured to automatically adjust its own configuration to optimally conform to a particular operation. Additionally, the imaging device 104 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the received illumination through the imaging aperture 154.

The user interface label 156 may include the dome switch/button 158 and one or more LEDs 160, and may thereby enable a variety of interactive and/or indicative features. Generally, the user interface label 156 may enable a user to trigger and/or tune to the imaging device 104 (e.g., via the dome switch/button 158) and to recognize when one or more functions, errors, and/or other actions have been performed or taken place with respect to the imaging device 104 (e.g., via the one or more LEDs 160). For example, the trigger function of a dome switch/button (e.g., dome switch/button 158) may enable a user to capture an image using the imaging device 104 and/or to display a trigger configuration screen of a user application (e.g., 3D imaging application 122). The trigger configuration screen may allow the user to configure one or more triggers for the imaging device 104 that may be stored in memory (e.g., the memory 120) for use in other operations, as discussed herein.

As another example, the tuning function of a dome switch/button (e.g., dome switch/button 158) may enable a user to automatically and/or manually adjust the configuration of the imaging device 104 in accordance with a preferred/predetermined configuration and/or to display an imaging configuration screen of a user application (e.g., 3D imaging application 122). The imaging configuration screen may allow the user to configure one or more configurations of the imaging device 104 (e.g., aperture size, exposure length, etc.) that may be stored in memory (e.g., the memory 120) for use in other operations, as discussed herein.

In addition, the imaging device 104 may include several hardware components contained within the housing 152 that enable connectivity to a computer network (e.g., network 106). For example, the imaging device 104 may include a networking interface that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 2:
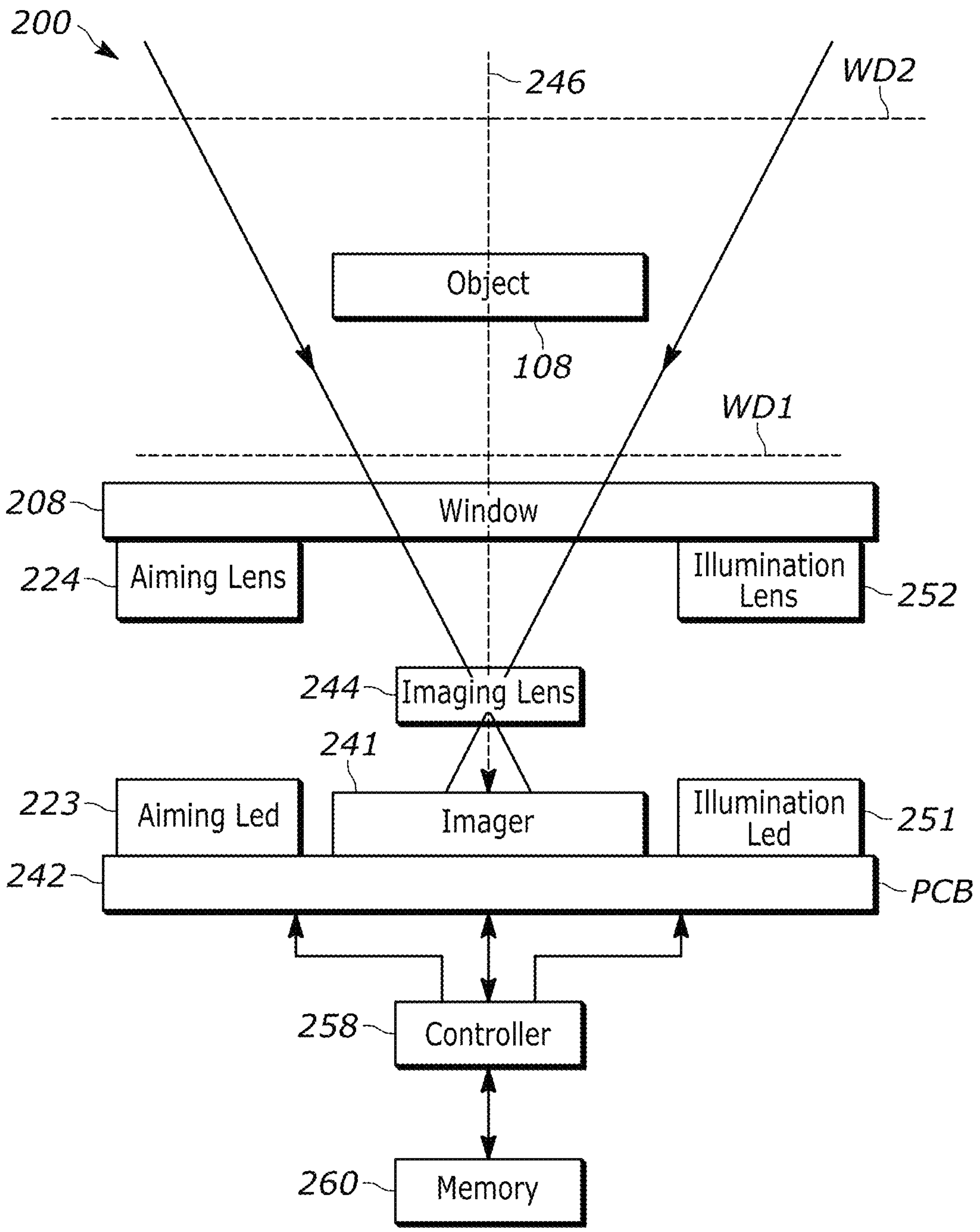
FIG. 2 illustrates a block diagram of an example imaging device such as the example imaging device(s) of FIGS. 1A-1B.

Referring to FIG. 2, a block diagram of an example architecture for an imaging device such as an imaging device 104 and/or some other imaging device (not shown) is depicted. For at least some implementations, an imaging assembly of the imaging device 200 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, an array of addressable image sensors or pixels arranged in a single row, arranged in mutually orthogonal rows and columns, etc., and operative for detecting return light captured by an imager 241 over a field of view along an imaging axis 246 through the window 208. The imager 241 may be or include a 3D camera, as described above with regard to imaging assembly 126 of FIG. 1A-1B. For example, the imager 241 may include or be a three-dimensional (3D) camera for capturing, sensing, or scanning 3D image data. The 3D camera may include an Infra-Red (IR) projector and a related IR camera for capturing, sensing, or scanning 3D image data/datasets. A 3D camera may include one or more of a time-of-flight (ToF) camera, a stereo vision camera, a structured light camera, a range camera, a 3D profile sensor, or a triangulation 3D imager. In some implementations, the 3D camera uses illumination and/or ambient light to measure distance data (e.g., one or more distances between the 3D camera of the imager 241 and a surface and/or object). In some embodiments, the imager may capture 2D images, and related 2D image data, at the same or similar point in time as the 3D camera such that the imaging device 200 can have both sets of 3D image data and 2D image data available for a particular surface, object, area, or scene at the same or similar instance in time. In examples, a 3D image may include a point cloud or 3D point cloud. It will be understood that, although imager 241 is depicted in FIG. 2 as a single block, that imager 241 may be multiple sensors positioned in different locations of imaging device 200.

The return light is scattered and/or reflected from an object 108 over the field of view. The imaging lens 244 is operative for focusing the return light onto the array of image sensors to enable the object 108 to be imaged. In particular, the light that impinges on the pixels is sensed and the output of those pixels produce image data that is associated with the environment that appears within the FOV (which can include the object 108). This image data is typically processed by a controller (usually by being sent to a decoder) which identifies and decodes decodable indicia captured in the image data. Once the decode is performed successfully, the reader can signal a successful "read" of the object 108 (e.g., a barcode). The object 108 may be located anywhere in a working range of distances between a close-in working distance (WD1) and a far-out working distance (WD2). In some implementations, WD1 is about one-half inch from the window 208, and WD2 is about thirty inches from the window 208, though it will be understood that other distances are anticipated.

An illuminating light assembly may also be mounted in, attached to, or associated with the imaging device 200. The illuminating light assembly includes an illumination light source 251, such as at least one light emitting diode (LED) and at least one illumination lens 252, and a plurality of illumination and illumination lenses, configured to generate a substantially uniform distributed illumination pattern of illumination light on and along the object 108 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 108.

An aiming light assembly may also be mounted in, attached to, or associated with the imaging device 200 and may include an aiming light source 223 (e.g., one or more aiming LEDs or laser light sources) and an aiming lens 224 for generating and directing a visible aiming light beam away from the imaging device 200 onto the object 108 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to sufficiently illuminate an object 108 and/or an indicia of the object 108 (e.g., for image capture). An aiming light assembly instead provides a defined illumination pattern (e.g., to assist a user in visualizing some portion of the FOV). Similarly, in some implementations, the illumination light source 251 and the aiming light source 223 are active at different, non-overlapping times. For example, the illumination light source 251 may be active on frames when image data is being captured and the aiming light source 223 may be active on frames when image data is not being captured (e.g., to avoid interference with the content of the image data).

In further implementations, the imaging device 200 may additionally emit an auditory cue, such as a chime, beep, message, etc. In still further implementations, the imaging device 200 may provide haptic feedback to a user, such as vibration (e.g., a single vibration, vibrating in a predetermined pattern, vibrating synchronized with flashing, etc.).

Further, the imager 241, the illumination source 251, and the aiming source 223 are operatively connected to a controller or programmed controller 258 (e.g., a microprocessor facilitating operations of the other components of imaging device 200) operative for controlling the operation of these components. In some implementations, the controller 258 functions as or is communicatively coupled to a vision application processor for receiving, processing, and/or analyzing the image data captured by the imager 241.

A memory 260 is connected and accessible to the controller 258. The controller 258 may be the same as the one used for processing the captured return light from the illuminated object 108 to obtain data related to the object 108. Though not shown, additional optical elements, such as collimators, lenses, apertures, compartment walls, etc. may be provided in the housing (e.g., as described above with regard to FIGS. 1A-1B). Although FIG. 2 shows the imager 241, the illumination source 251, and the aiming source 223 as being mounted on the same PCB 242, it should be understood that different implementations of the imaging device 200 may mount each component on a separate PCB, or in different combinations on separate PCBs. For example, in an implementation of the imaging device 200, the illumination LED source is provided as an off-axis illumination (i.e., has a central illumination axis that is not co-axial with the central FOV axis).

Figure 3:
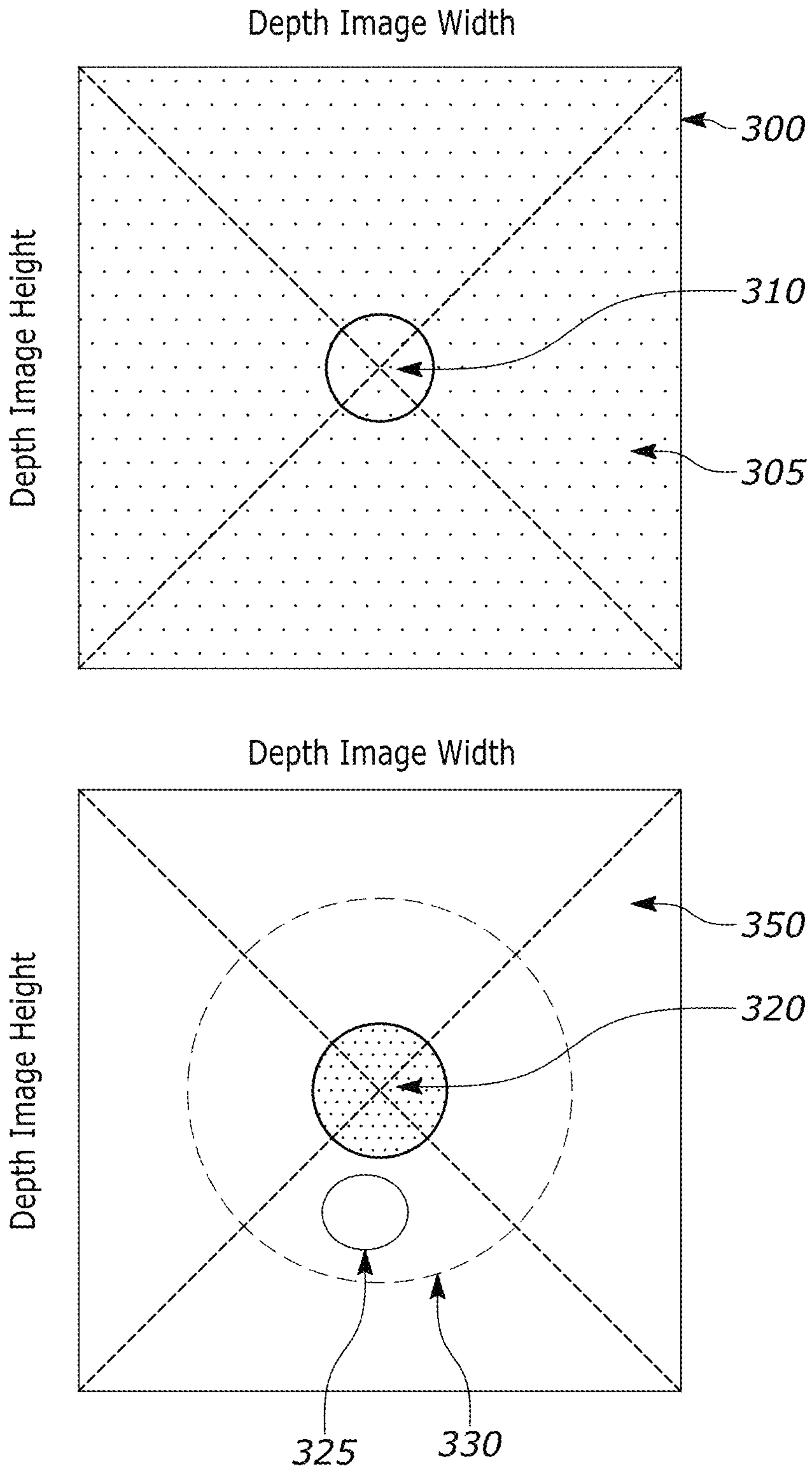
FIG. 3 illustrates depth images representative of one or more depth values corresponding to various pixels of the image(s) and including an indicator indicative of a 3D angular offset between a surface normal of an object and the imaging axis of an exemplary imaging device capturing the image(s), such as the example imaging device(s) of FIGS. 1A-1B.

Referring to FIG. 3, two depth images generated by an imaging device for performing the operations as described herein are illustrated. Depending on the implementation, one or more images may be captured and/or generated by an imaging device 104, an imaging device 200, and/or any other such device. The imaging device may generate the initial depth image 300 by capturing an image using an imaging assembly (e.g., including a 3D imaging sensor). The imaging device may subsequently generate the indicator depth image 350 using the initial depth image 300. Depending on the implementation, the imaging device may generate the initial depth image 300 and the indicator depth image 350 with a depth image width and a depth image height based on a field of view (FOV) of the imaging assembly, 3D imaging sensor, etc.

In some implementations, the imaging device generates the initial depth image 300 including a plurality of depth pixels 305, each indicative of a depth of a corresponding portion of the image. The imaging device may designate a portion of the initial depth image 300 as a region of interest (ROI) 310. Depending on the implementation, the ROI 310 may be based on a center of a FOV of the imaging device. In further implementations, the ROI 310 may be based on a user indication (e.g., a user touch event on a touch screen, a user button press, a user voice command, etc.). In still further implementations, the ROI 310 may be based on a determination by the imaging device regarding an importance of an object in the FOV (e.g., an object located entirely within the FOV, an object closest to the imaging device, an object with a high contrast to other objects in the FOV, etc.).

The imaging device may then discard, remove, and/or otherwise ignore pixels outside of the ROI 310 such that only ROI pixels 320 are considered by the imaging device. In further implementations, the imaging device additionally or alternatively discards low confidence pixels (e.g., pixels to which the imaging device assigns a low confidence score regarding position, measurement, depth, etc.). The imaging device may then use the ROI pixels 320 to determine a plane that fits all, most, or more than a threshold number of pixels (e.g., a fitted plane).

In some implementations, the imaging device generates the fitted plane using the ROI pixels 320. Depending on the implementation, the imaging device generates the fitted plane such that the fitted plane fits a greatest number of ROI pixels 320. In further implementations, the imaging device generates the fitted plane such that the plane fits a predetermined threshold number of ROI pixels 320. In still further implementations, the imaging device generates the fitted plane such that the plane fits a plurality of ROI pixels 320 with the highest confidence levels.

Once the imaging device generates the fitted plane, the imaging device determines a surface normal of the fitted plane. For example, the imaging device determines a line perpendicular to the fitted plane. Then, the imaging device determines a 3D angular offset of an angle between the surface normal and an imaging axis of the imaging device (e.g., a direction of a center of the FOV of the imaging device). Depending on the implementation, the 3D angular offset may include an indication of a direction of the angular offset and/or a value indicative of the degree of offset. For example, the value may include x and/or y value(s) that range from 0 to 90 degrees, 0 to 180 degrees, −180 to 180 degrees, etc.

The imaging device further generates an indicator 325 indicative of the 3D angular offset between the surface normal of the fitted plane and the imaging axis of the imaging device. In some implementations, the imaging device designates a boundary 330 for freedom of motion for the indicator 325. As such, the imaging device in some such implementations will generate the indicator 325 within the boundary 330. Depending on the implementation, the boundary 330 is based on a predetermined set of threshold values for the 3D angular offset within which the imaging device renders a position of the indicator 325. For example, the boundary 330 may be defined by x and/or y value(s) that range between 0 to 45 degrees in any direction, 0 to 60 degrees in any direction, −90 to 90 degrees, etc. In further implementations, a user may define and/or adjust the boundary 330 via the imaging device. In still further implementations, the imaging device provides a default value that the user may adjust for the boundary values 330. It will be understood that, although FIG. 3 depicts an exemplary boundary 330 as a circle, the boundary may be any shape (e.g., an ellipse, a square, a rectangle, an octagon, a custom shape, etc.).

In some implementations, the indicator 325 moves within the boundary 330 in accordance with a proportion and/or value of the 3D angular offset. For example, in some implementations, the indicator 325 moves by an absolute value towards the edge of the boundary 330 (e.g., if the boundary 330 is at 60 degrees in a given direction, then 30 degrees would be halfway between the center and the boundary 330). In further implementations, the indicator 325 moves by a proportional value (e.g., if the boundary 330 is visually located at 60 degrees, but the movement is proportional to a 90 degree range, then 45 degrees would cause the indicator to be displayed as halfway between the center and the edge of the boundary 330). In still further implementations, the indicator 325 moves logarithmically. Depending on the implementation, the indicator 325 may move in the same direction as the imaging device (e.g., moving up when the device is tilted up), in the opposite direction as the imaging device (e.g., moving up when the device is tilted down), etc. In some implementations, the imaging device may be capable of providing any such movement technique to the user for selection (e.g., in a settings menu).

In further implementations, the imaging device changes the color of the indicator 325 outside of the boundary 330. In still further implementations, the imaging device hides the indicator 325 outside of the boundary 330. In yet still further implementations, the imaging device prevents movement of the indicator 325 beyond the boundary 330. As such, the indicator may move to the boundary 330 and may remain in place for all values beyond the values represented by the boundary 330 unless and/or until the 3D angular offset reaches below the threshold values associated with the boundary 330.

In some implementations, when the angular offset is small (e.g., 0 degrees, within a predetermined range of 0 degrees, below a predetermined threshold value, etc.), the indicator 325 moves within the ROI 310. As such, when the indicator 325 is in the center of the indicator depth image 350 and/or within the ROI 310 (e.g., if the ROI 310 is displayed to the user), the imaging axis and the surface normal are aligned and/or close to aligned. As such, an observer will understand that the surface of an object being imaged is flat and/or properly centered within the corresponding FOV, as depicted in more detail below with regard to FIGS. 4A-5.

Figure 4A:
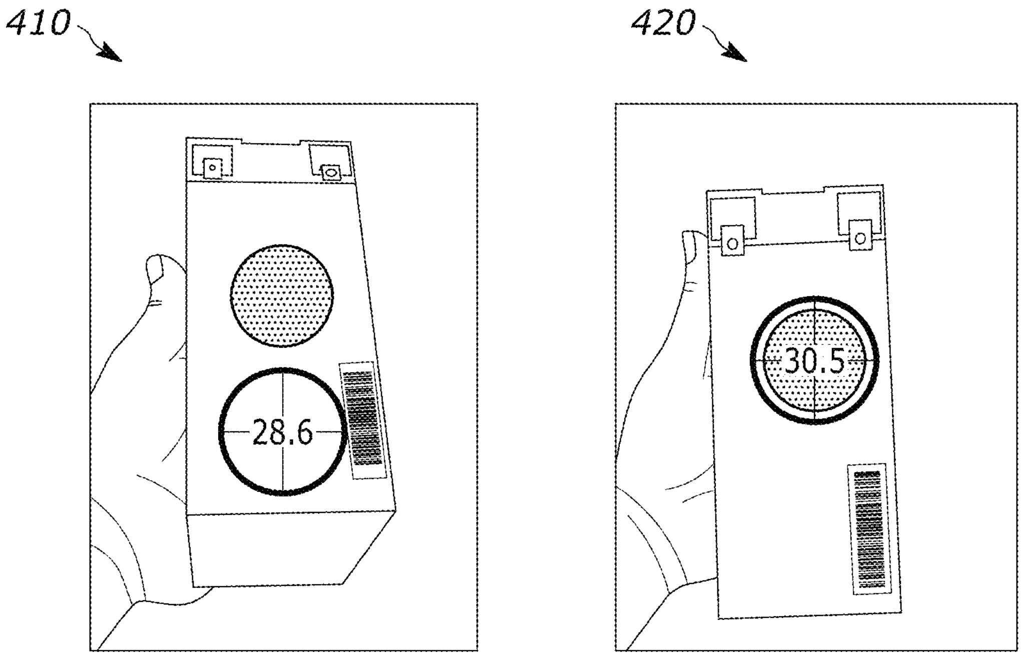
FIG. 4A illustrates an exemplary field of view (FOV) including an object and a generated indicator of the 3D angular offset for the object.
Figure 4B:
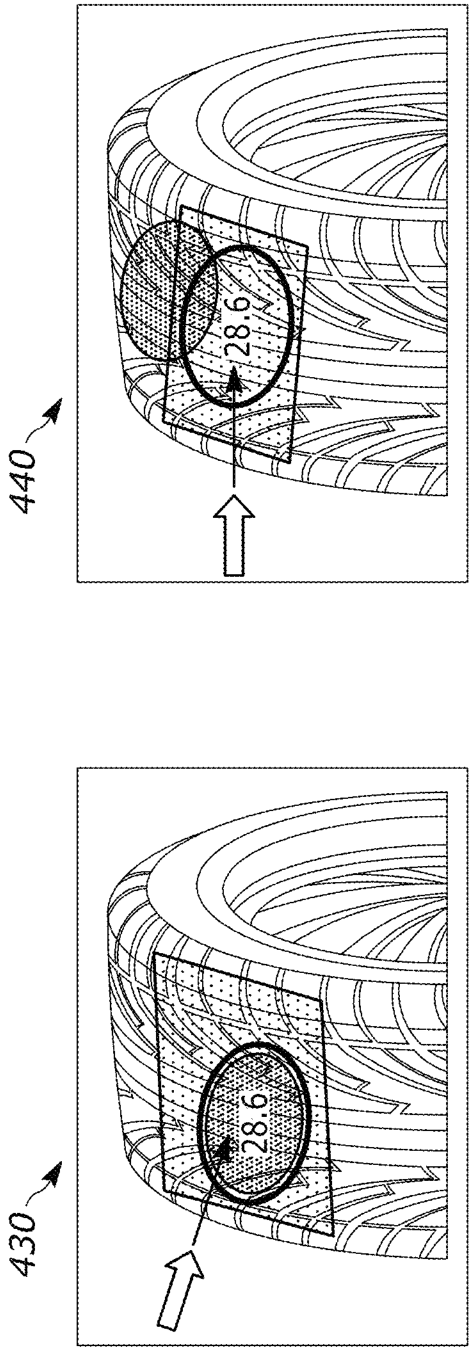
FIG. 4B illustrates an exemplary FOV including a curved object and a generated indicator of the 3D angular offset for the curved object.

In the exemplary embodiment of FIG. 4A, two exemplary FOVs 410 and 420 are illustrated. FOV 410 depicts an object with a 3D angular offset large enough that the indicator is not aligned with the ROI. FOV 420 depicts the same object with the 3D angular offset close to 0 such that the indicator is aligned with the ROI. In some implementations, the FOVs 410 and 420 may include an indication of a parameter (e.g., a distance to the object, an angle of the object, etc.) in the FOV(s) 410 and/or 420 (e.g., 28.6 cm, 30.5 cm, etc.). Similarly, in the exemplary embodiment of FIG. 4B, two additional FOVs 430 and 440 are depicted of an object with a curved surface. Because the imaging device calculates a fitted plane based on the techniques described herein (e.g., a greatest number of fitting pixels) within the ROI, the imaging device is capable of determining the 3D angular offset for curved objects and indicating an indicator for a user as well. As such, the FOV 440 depicts a curved object with a 3D angular offset large enough that the indicator is not aligned with the ROI, and the FOV 430 depicts the curved object with the 3D angular offset close to 0 such that the indicator is aligned with the ROI.

Figure 5:
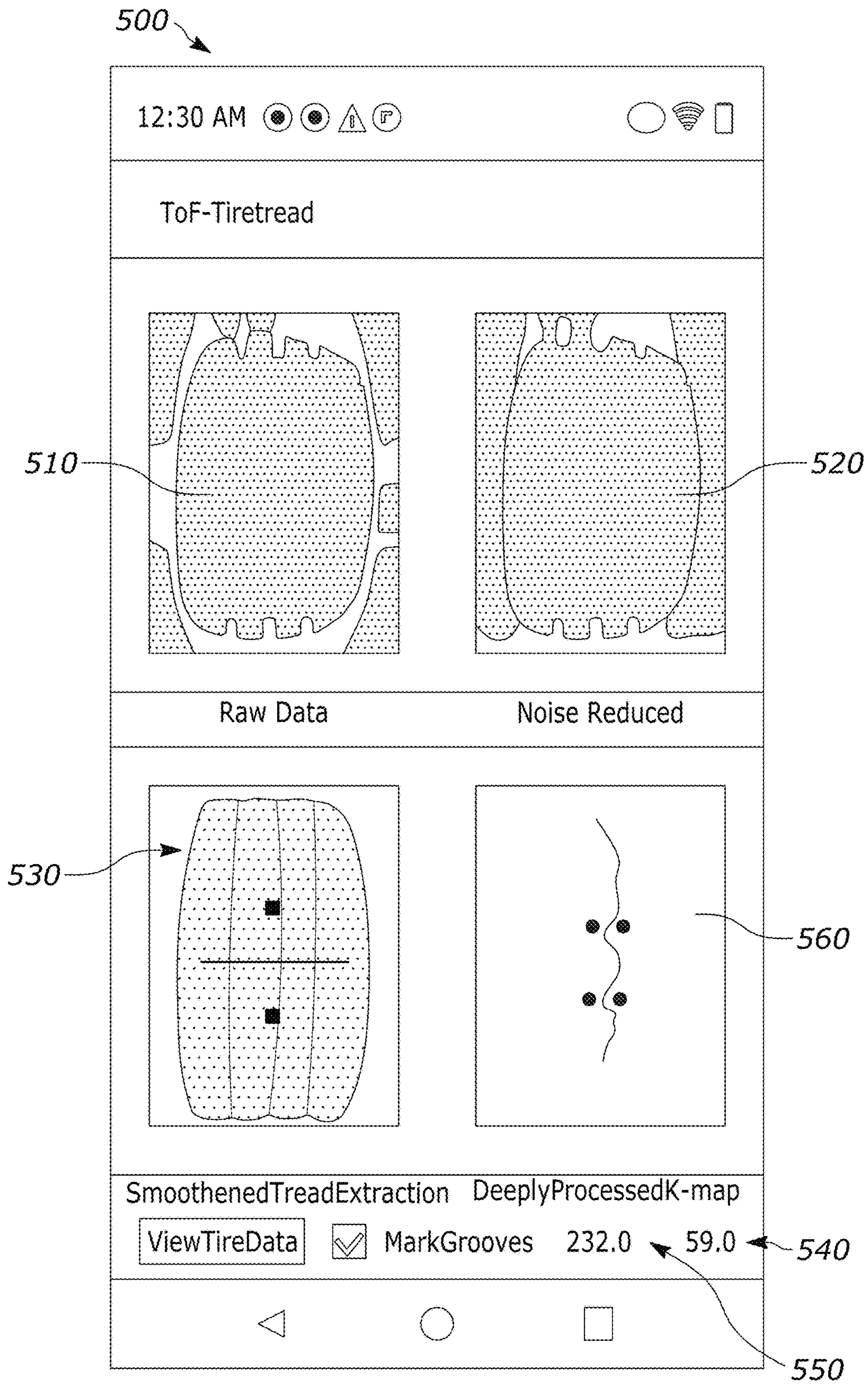
FIG. 5 illustrates an exemplary user interface (UI) for an application implementing the techniques described herein and generating an indicator and/or measurement for a given object.

Referring to FIG. 5, the exemplary user interface (UI) 500 depicts image data 510 of an object and a determined 3D angular offset. The UI 500 also depicts noise reduced image data 520 and indicator depth image data 530 (e.g., similar to indicator depth image 350 of FIG. 3), including an indicator as described herein. Similarly, in the exemplary embodiment of FIG. 5, the UI 500 depicts a processed k-map 560 of the image data, including a line indicative of a center of mass and/or an indicator of the feature to be imaged and/or identified (e.g., tire treads in the case of the exemplary embodiment of FIG. 5). The UI 500 depicts a calculated 3D angular offset value 540 and a range value 550 of the object as well.

Figure 6:
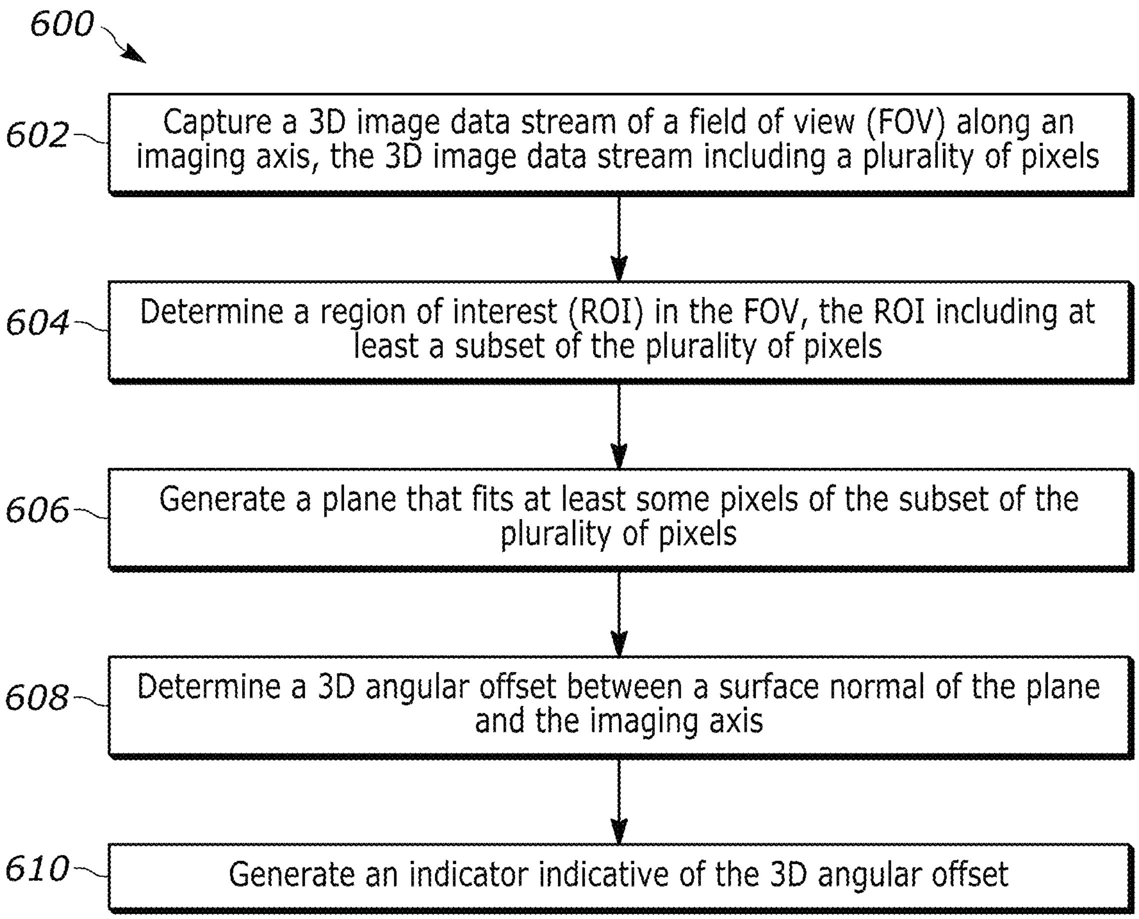
FIG. 6 illustrates a flow diagram of an example method to determine and generate an indicator of a 3D angular offset between a surface normal of an object and an imaging axis of an imaging device, such as that depicted in FIGS. 1A-2.

Referring next to FIG. 6, the method 600 illustrates a flow diagram of an example method for capturing 3D image data, determining a 3D angular offset, and generating an indicator indicative of the 3D angular offset. Although the method 600 is described below with regard to imaging device 200 of FIG. 2, it will be understood that other similarly suitable imaging devices and/or components may be used instead (e.g., imaging device 104, etc.).

At block 602, the imaging device 200 captures a 3D image data stream of a field of view (FOV) along an imaging axis. In some implementations, the 3D image data stream includes a plurality of pixels indicative of corresponding depth values. In some implementations, the imaging device 200 captures a 3D image data stream of the FOV surrounding a center of the FOV. In further implementations, a user indicates a particular object (e.g., by a tap event, a button press, voice command, etc.) to indicate to the imaging device 200 to capture the 3D image data stream (e.g., while the object is in the FOV, until an event end indication (e.g., a button press, tap event, voice command, etc.), while the indication is occurring, etc.).

At block 604, the imaging device 200 determines a region of interest (ROI) in the FOV. In some implementations, the ROI includes at least a subset of the plurality of pixels included in the 3D image data stream. In some such implementations, the imaging device 200 filters depth values of the plurality of pixels to remove depth values other than the subset of the plurality of pixels in the ROI. In further implementations, the imaging device 200 additionally or alternatively filters depth values of the pixels to remove depth values associated with confidence level values that do not meet a predetermined threshold confidence value. For example, the imaging device 200 may determine confidence values for each depth value and/or pixel based on a confidence in the accuracy of the depth value, a confidence in the placement of the depth value, a confidence in the existence of an object at the pixel location, etc.). In further implementations, the confidence score may be indicative of a noise for the corresponding pixel(s). In some implementations, if an overall confidence score is below a predetermined threshold or a predetermined number of pixels are too noisy, the imaging device 200 may perform a denoising procedure before performing block 604 and/or 606. In further implementations, the imaging device 200 performs a denoising procedure before performing block 604 and/or 606.

In some implementations, the ROI size and/or position is based on a preferred radius and/or location for the user (e.g., by one or more settings of the imaging device determined by the user). In further implementations, the imaging device 200 automatically determines an ROI size and/or position (e.g., based on an FOV size, detected object, etc.). In still further implementations, the imaging device 200 uses a default value and/or location for the ROI size and/or position.

At block 606, the imaging device 200 generates a plane that fits at least some pixels of the subset of the plurality of pixels. In some implementations, the imaging device 200 generates a plane responsive to detecting a sufficient number of pixels with depth values within the ROI. For example, the imaging device 200 may determine whether the subset of the plurality of pixels includes a number of pixels such that the number of pixels meets a minimum pixel threshold value and generates the plane responsive to such. In further implementations, if the imaging device 200 does not detect more than the minimum pixel threshold value, the imaging device 200 may refrain from generating the plane and may instead generate and/or provide a notification to a user that an imaging error has occurred. In some implementations, the imaging device 200 further provides an explanation for the error (e.g., an indication that an object is not detected, an indication that the imaging device 200 cannot detect a cohesive shape for the object, etc.) and/or instructions for the user (e.g., an indication to direct the imaging device 200 to an object). In such implementations, the imaging device 200 may determine an updated ROI for the 3D image data stream (e.g., expanding or shrinking the ROI) and generating the plane based on the pixels within the updated ROI. In further implementations, the imaging device 200 may generate an an indication of an error state by obfuscating the indicator, changing a color of the indicator, and/or otherwise modifying the indicator.

In some implementations, the imaging device 200 generates the plane using a plane fitting operation (e.g., a random sampling and consensus (RANSAC) fitting operation, a Hough fitting operation, etc.). In further implementations, the imaging device 200 applies a plane and experimentally fits the plane to the pixel depths until a predetermined threshold proportion of pixels fit the plane, until a greatest number of pixels is determined to fit the plane, etc. In some implementations, the imaging device 200 uses a point cloud library (PCL), mobile dimensioning solution (e.g., measuring objects using 3D data), and/or any other such technique or library as described herein to perform the fitting.

At block 608, the imaging device 200 determine a 3D angular offset between a surface normal of the plane and the imaging axis. In some implementations, the imaging device 200 calculates the surface normal using the equation of the plane (e.g., determining a vector perpendicular to the surface normal). Depending on the implementation, the imaging device 200 may calculate an angle value and/or a direction of the 3D angular offset. In some implementations, the imaging device 200 calculates (x, y) coordinates of the imaging axis and/or surface normal of the plane, using the other as a reference coordinate position (e.g., coordinate (0, 0)). In further implementations, the imaging device 200 calculates a positive and/or negative angle or angles within a predetermined range of angles as described elsewhere herein. In still further implementations, the imaging device 200 uses algorithms and/or libraries as described with regard to determining the surface normal and/or fitted plane to determine the 3D angular offset.

At block 610, the imaging device 200 generates an indicator indicative of the 3D angular offset. In some implementations, the indicator moves around a display of the imaging device and/or a communicatively coupled computing device based on the 3D angular offset. In particular, the indicator may be a virtual representation of the 3D angular offset displayed to a user via a screen of the imaging device at a determined location of the screen (e.g., based on the 3D angular offset). The determined location of the screen may be within the ROI when the 3D angular offset is within a threshold value of zero (e.g., below a threshold value, within a predetermined range of values, approximately equivalent to zero, etc.).

In some implementations, the imaging device 200 generates the indicator within bounds of a boundary that encompasses the ROI. In some such implementations, the boundary delimits a boundary of movement for the indicator. Depending on the implementation, the imaging device 200 may change the color of the indicator when the indicator exits the boundary, visually maintain the indicator at the edge of the boundary even if the indicator position is calculated to be beyond the boundary, obfuscate (e.g., hide, conceal, modify, etc.) the indicator responsive to the indicator leaving the boundary, etc.

In some implementations, the imaging device 200 detects a change in depth values corresponding to updated positions of the subset of the plurality of pixels (e.g., when the imaging device 200 moves, the object moves, the FOV of the imaging device zooms, etc.). The imaging device 200 may then generate an updated plane based on the updated position of the subset of the plurality of pixels. Using the updated plane, the imaging device 200 may determine an updated 3D angular offset between an updated surface normal of the updated plane and the imaging axis, as well as generate an updated indicator indicative of the updated 3D angular offset.

In some such implementations, the indicator is a virtual representation of the 3D angular offset displayed to a user via a screen of the imaging device at a first location of the screen, the first location based on the 3D angular offset. Similarly, generating the updated indicator therefore includes determining a second location of the virtual representation based on the updated 3D angular offset and causing the screen to display movement of the virtual representation from the first location to the second location. As such, the imaging device 200 may continuously update a position of the indicator while moving, tilting, zoom, or otherwise modifying a FOV or position of the imaging device 200.

Embodiments of the present disclosure may have certain advantages over traditional approaches. For example, using a technique for scanning a first indicia to initiate the connection process and a second indicia for determining the entire passcode may reduce the overall processing and/or computing resources required compared to other potential techniques, such as decoding a plurality of barcodes (e.g., six barcodes) to input the passcode. Similarly, using a technique for scanning an indicia to initiate the connection process and performing an OCR procedure to determine the entire passcode may reduce the overall processing and/or computing resources required. Moreover, by implementing such techniques, an imaging device may be enabled to establish a secure connection with another computing device with fewer timeouts, reducing the number of reestablishment requests are transmitted, thereby further improving overall functionality (e.g., by reducing the processing time and computing resources required).

The following list of aspects reflects a variety of the embodiments explicitly contemplated by the present disclosure:

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device, comprising:

one or more processors;

a 3-dimensional (3D) imaging assembly; and a computer-readable medium storing machine readable instructions that, when executed, cause the one or more processors to:

capture, using the 3D imaging assembly, a 3D image data stream of a field of view (FOV) along an imaging axis, the 3D image data stream including a plurality of pixels indicative of corresponding depth values;

determine a region of interest (ROI) in the FOV, the ROI including at least a subset of the plurality of pixels;

generate a plane that fits at least some pixels of the subset of the plurality of pixels;

determine a 3D angular offset between a surface normal of the plane and the imaging axis; and generate an indicator indicative of the 3D angular offset.

2. The imaging device of claim 1, wherein the computer-readable medium stores further machine readable instructions that, when executed, cause the one or more processors to:

detect a change in the corresponding depth values corresponding to updated positions of the subset of the plurality of pixels; and generate an updated plane based on the updated positions of the subset of the plurality of pixels.

3. The imaging device of claim 2, wherein the computer-readable medium stores further machine readable instructions that, when executed, cause the one or more processors to:

determine an updated 3D angular offset between an updated surface normal of the updated plane and the imaging axis; and generate an updated indicator indicative of the updated 3D angular offset.

4. The imaging device of claim 3, wherein:

the indicator is a virtual representation of the 3D angular offset displayed to a user via a screen of the imaging device at a first location of the screen, the first location based on the 3D angular offset; and generating the updated indicator includes:

determining a second location of the virtual representation based on the updated 3D angular offset, and causing the screen to display movement of the virtual representation from the first location to the second location.

5. The imaging device of claim 1, wherein:

the indicator is a virtual representation of the 3D angular offset displayed to a user via a screen of the imaging device at a determined location of the screen, the determined location based on the 3D angular offset; and the determined location of the screen is within the ROI when the 3D angular offset is within a threshold value of zero.

6. The imaging device of claim 1, wherein the computer-readable medium stores further machine readable instructions that, when executed, cause the one or more processors to:

generate a boundary that encompasses the ROI, wherein the boundary delimits a boundary of movement for the indicator.

7. The imaging device of claim 6, wherein:

the indicator is a virtual representation of the 3D angular offset displayed to a user via a screen of the imaging device at a determined location of the screen, the determined location based on the 3D angular offset; and the determined location is located between a center of the ROI and an edge of the boundary such that the determined location is proportional to a ratio between the 3D angular offset and a maximum 3D angular offset value.

8. The imaging device of claim 1, wherein the computer-readable medium stores further machine readable instructions that, when executed, cause the one or more processors to:

filter the corresponding depth values to remove depth values other than the subset of the plurality of pixels.

9. The imaging device of claim 1, wherein the computer-readable medium stores further machine readable instructions that, when executed, cause the one or more processors to:

filter depth values of the subset of the plurality of pixels to remove depth values associated with confidence level values that do not meet a predetermined threshold confidence value.

10. The imaging device of claim 1, wherein the computer-readable medium stores further machine readable instructions that, when executed, cause the one or more processors to:

determine whether the subset of the plurality of pixels includes a number of pixels that meets a minimum pixel threshold value; and wherein generating the plane is responsive to determining that the number of pixels meets the minimum pixel threshold value.

11. The imaging device of claim 10, wherein the computer-readable medium stores further machine readable instructions that, when executed, cause the one or more processors to:

generate an indication of an error state responsive to determining that the number of pixels does not meet the minimum pixel threshold value.

12. The imaging device of claim 11, wherein generating the indication of the error state includes at least one of: (i) obfuscating the indicator or (ii) changing a color of the indicator.

13. The imaging device of claim 11, wherein the computer-readable medium stores further machine readable instructions that, when executed, cause the one or more processors to:

responsive to generating the indication of the error state, determine an updated ROI in the FOV for the 3D image data stream, the updated ROI including at least an updated subset of the plurality of pixels; and wherein generating the plane is based on the updated subset of the plurality of pixels.

14. A method, implemented in an imaging device including a 3-dimensional (3D) imaging assembly, the method comprising:

capturing, via one or more processors and using the 3D imaging assembly, a 3D image data stream of a field of view (FOV) along an imaging axis, the 3D image data stream including a plurality of pixels indicative of corresponding depth values;

determining, via the one or more processors, a region of interest (ROI) in the FOV, the ROI including at least a subset of the plurality of pixels;

generating, via the one or more processors, a plane that fits at least some pixels of the subset of the plurality of pixels;

determining, via the one or more processors, a 3D angular offset between a surface normal of the plane and the imaging axis; and generating, via the one or more processors, an indicator indicative of the 3D angular offset.

15. The method of claim 14, further comprising:

detecting, via the one or more processors, a change in the corresponding depth values corresponding to updated positions of the subset of the plurality of pixels; and generating, via the one or more processors, an updated plane based on the updated positions of the subset of the plurality of pixels.

16. The method of claim 15, further comprising:

determining, via the one or more processors, an updated 3D angular offset between an updated surface normal of the updated plane and the imaging axis; and generating, via the one or more processors, an updated indicator indicative of the updated 3D angular offset.

17. The method of claim 16, wherein:

the indicator is a virtual representation of the 3D angular offset displayed to a user via a screen of the imaging device at a first location of the screen, the first location based on the 3D angular offset; and generating the updated indicator includes:

determining a second location of the virtual representation based on the updated 3D angular offset, and causing the screen to display movement of the virtual representation from the first location to the second location.

18. The method of claim 14, wherein:

the indicator is a virtual representation of the 3D angular offset displayed to a user via a screen of the imaging device at a determined location of the screen, the determined location based on the 3D angular offset; and the determined location of the screen is within the ROI when the 3D angular offset is within a threshold value of zero.

19. The method of claim 14, further comprising:

generating, via the one or more processors, a boundary that encompasses the ROI, wherein the boundary delimits a boundary of movement for the indicator.

20. The method of claim 19, wherein:

the indicator is a virtual representation of the 3D angular offset displayed to a user via a screen of the imaging device at a determined location of the screen, the determined location based on the 3D angular offset; and the determined location is located between a center of the ROI and an edge of the boundary such that the determined location is proportional to a ratio between the 3D angular offset and a maximum 3D angular offset value.

21. The method of claim 14, further comprising:

filtering, via the one or more processors, the corresponding depth values to remove depth values other than the subset of the plurality of pixels.

22. The method of claim 14, further comprising:

filtering, via the one or more processors, depth values of the subset of the plurality of pixels to remove depth values associated with confidence level values that do not meet a predetermined threshold confidence value.

23. The method of claim 14, further comprising:

determining, via the one or more processors, whether the subset of the plurality of pixels includes a number of pixels that meets a minimum pixel threshold value; and wherein generating the plane is responsive to determining that the number of pixels meets the minimum pixel threshold value.

24. The method of claim 23, further comprising:

generating, via the one or more processors, an indication of an error state responsive to determining that the number of pixels does not meet the minimum pixel threshold value.

25. The method of claim 24, wherein generating the indication of the error state includes at least one of: (i) obfuscating the indicator or (ii) changing a color of the indicator.

26. The method of claim 24, further comprising:

responsive to generating the indication of the error state, determining, via the one or more processors, an updated ROI in the FOV for the 3D image data stream, the updated ROI including at least an updated subset of the plurality of pixels; and wherein generating the plane is based on the updated subset of the plurality of pixels.

* * * * *